3,182,295
SHIFT REGISTER DEVICE

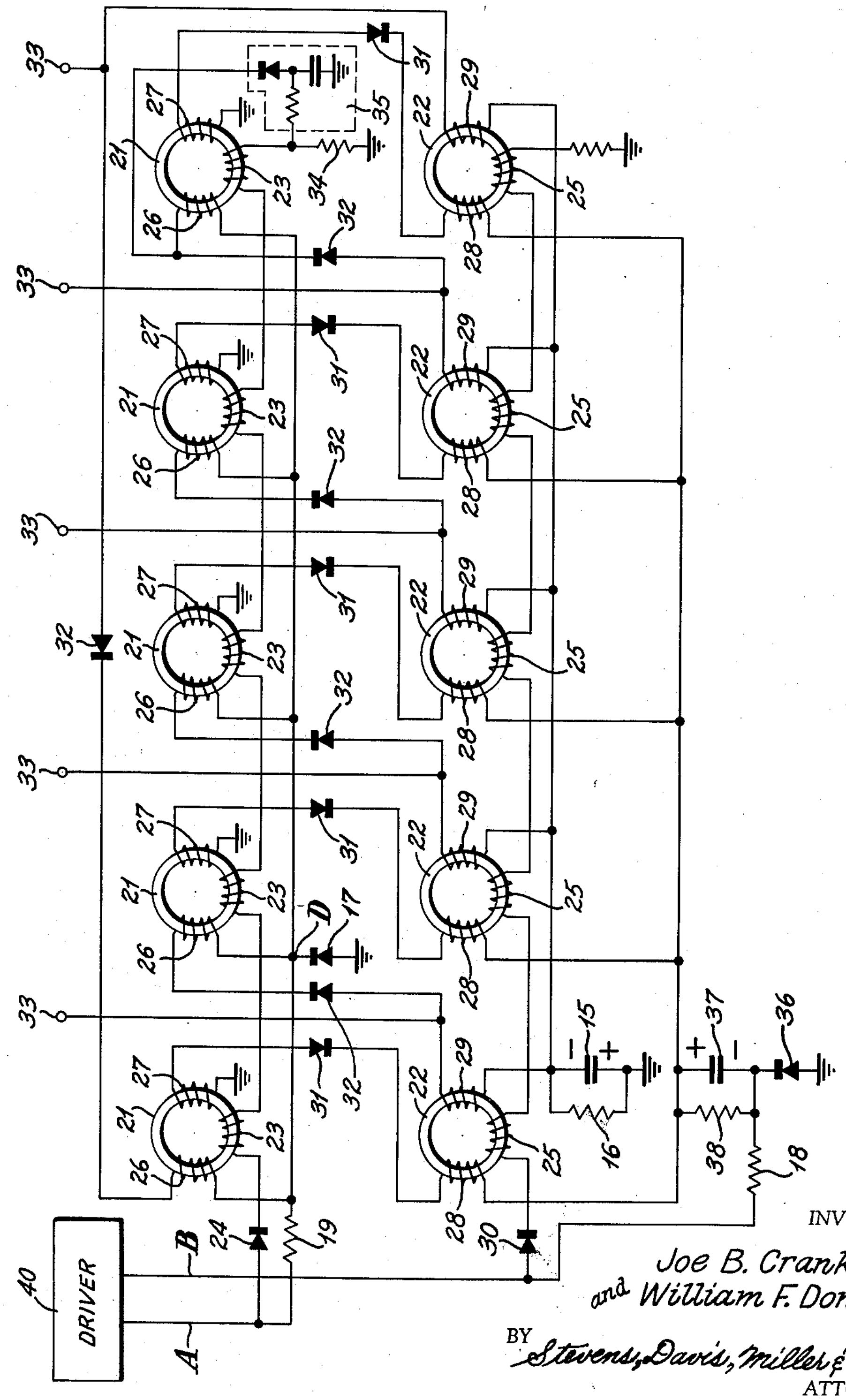
INVENTORS
Joe B. Crank
and William F. Donnell
BY
Stevens, Davis, Miller & Mosher
ATTORNEYS United States Patent Office
3,182,295
Patented May 4, 1965

Joe B. Crank, Dallas, and William F. Donnell, Richardson, Tex., assignors to Texas Instruments Incorporated, Dallas, Tex., a corporation of Delaware Filed Oct. 14, 1959, Ser. No. 846,285
4 Claims. (Cl. 340—174)

This invention relates to a magnetic core shift register connected as an apparatus for generating output signals sequentially and cyclically from several outputs. The present invention is disclosed in the copending application Serial No. 818,897 of William F. Donnell and Joe B. Crank and Marcus E. North, entitled Solid State Commutator, filed June 8, 1959 and now abandoned.

In the field of data processing, computers, and telemetering there is a need for an apparatus which will generate output pulses sequentially and cyclically from a plurality of outputs. For example, in a computer such a device is often used in the programmer to signal the sequence of commands given by the computer. In telemetering such devices are used to sequentially enable AND gates so as to transmit information from a large number of sources over a single channel on a time sharing basis. A magnetic core shift register can be made to perform the function of generating output pulses sequentially and cyclically from a series of outputs, one taken from each stage of the shift register by connecting the shift register in a ring and circulating a single bit continuously through the shift register. However, in order for such a device to correctly perform the function, it must be insured that one and only one bit circulates in the shift register. If the shift register were performing the function in some inaccessible place such as in a satellite or a rocket, the accidental loss of the circulating bit or introduction of a second circulating bit could cause a complete malfunctioning which could not be corrected. The present invention has as its object to overcome this obstacle by providing a system for automatically reducing the number of circulating bits to one if there are more than one and for automatically restoring a bit if there are none.

Further objects and advantages of the invention will become readily apparent as the following detailed description of a preferred embodiment unfolds and when taken in conjunction with the single figure of the drawing which illustrates the magnetic core shift register of the invention.

As shown in the figure, the shift register comprises a first set of magnetic storage cores 22 and a second set of magnetic storage cores 21. The magnetic storage cores are of the type having a rectangular hysteresis loop and thus have two stable magnetic states. A driving winding 23 is wound on each of the cores 21 and the driving windings 23 are connected together in series to form the driving circuit A. A diode 24 is connected in series with this driving circuit to permit only positive pulses to be applied to the driving windings 23. The cores 22 each have a driving winding 25. The driving windings 25 are connected in series to form driving circuit B. A diode 30 is connected in series with the driving circuit B to permit only positive pulse to be applied to the driving windings 25. Each of the cores 21 has an input winding 26 and an output winding 27 and each of the cores 22 has an input winding 28 and an output winding 29. The output winding 27 of each of the cores 21 is connected to the input winding 28 of a different one of the cores 22 through a diode 31. The output winding 29 of each of the cores 22 is applied to the input winding 26 of a different one of the cores 21 through a diode 32. For convenience, the two stable states of the cores 21 and 22 shall be referred to as the ONE state and the ZERO state. The polarity of the windings 23 is such that when a positive pulse is applied to the driving circuit A through the diode 24, it will tend to cause all the cores 21 to switch to their ZERO states. Similarly, the polarity of the windings 25 is such that when a positive pulse is applied through the diode 30 to the driving circuit B, it will tend to cause the cores 22 to switch to their ZERO states.

In the operation of the shift register, one of the cores 21 or one of the cores 22 will be in its ONE state and all the rest of the cores will be in their ZERO states. The core which is in its ONE state will contain the bit. To advance the bit, positive pulses are alternately applied to the driving circuits A and B by a driver 40. These pulses shall be referred to as driving pulses. Assuming for purposes of description that the bit is stored in one of the cores 21, then when a positive pulse is applied to the driving circuit A, this core 21 will switch to its ZERO state. All the remaining cores 21 will already be in their ZERO states so this pulse will have no effect upon these cores. The core 21 which switches from its ONE to its ZERO state will cause a positive pulse to be induced in its output winding 27. This positive pulse will be transmitted to the input winding 28 of one of the cores 22 and cause this core 22 to be switched from its ZERO state to its ONE state. Thus the bit is transferred to this core 22. Next a positive pulse will be applied to the driving circuit B by the driver 40. This positive pulse will cause the core 22 which now stores the bit to switch to its ZERO state. The remaining cores 22 which are already in their ZERO states will be unaffected. A positive pulse will be induced in the output winding 29 of that core 22 which is switched from its ONE to its ZERO state. This pulse will be applied to the input winding 26 of another one of the cores 21. This core 21 will be switched to its ONE state and thus will store the bit. Thus the bit is shifted from magnetic core to magnetic core, alternating between the cores 21 and the cores 22. The bit is shifted each time into a different core until the bit has been shifted into all the cores 21 and 22 at which time the bit is shifted from the last core 22 to the first core 21 in which the bit originally started. The bit is then again shifted through all of the cores 21 and 22 in the same manner. The process will continue to repeat itself in this manner as long as the driver 40 applies the alternating positive pulses to the driving circuits A and B.

An output lead 33 is taken from the output winding 29 of each of the cores 22. When a bit is shifted out of one of the cores 22 then the output lead 33 from the output winding 29 of that core will receive a positive pulse applied thereto. Since the bit is shifted from core to core in sequence, an output pulse will be produced from the output leads 33 in sequence with the sequence being cyclically repeated. Thus an output pulse is produced from one of the output leads 33 each time the driver 40 applies a positive pulse to the driving circuit B. It will be observed that each stage of the shift register comprises one of the cores 21 and one of the cores 22. The cores 21 serve merely as a delay line between the cores 22 for advancing the bit from one core 22 to the next sequential core 22. This delay line is necessary so that the pulses applied to the driving circuits do not interfere with the transfer of the bit from core to core. Thus when the bit is transferred into a core 22, the pulse applied to the driving circuit B must be entirely completed. An RC delay line can be used to provide the necessary delay instead of the additional core.

The output windings 27 of the cores 21 are all connected to ground and the input windings 28 of the cores 22 are all connected together and to ground through a circuit comprising a diode 36 connected in series with a capacitor 37 shunted by a resistor 38. The output windings 29 of cores 22 are connected together and through a parallel circuit of a capacitor 15 and a resistor 16 to ground. The input windings 26 are connected together and through a diode 17 to ground. These connections to the input and output windings of cores 21 and 22 complete the circuit for the transmission of the positive transfer pulses from the output windings to the input windings of adjacent cores to shift the stored bit from core to core. The capacitors 15 and 37 are continuously maintained in a charged condition by the transfer pulses produced at the output windings of the cores 22 and 21 respectively. These capacitors thus provide a bias in opposition to transfer pulses.

A current limiting resistor 18 connects the input of the driving circuit B to the junction between the capacitor 37 and the diode 36. A current limiting resistor 19 connects the input of the driving circuit A to the common connection to the input windings 26 of the cores 21. Resistors 18 and 19 in conjunction with diodes 17 and 36 provide a clamping action which will maintain points C and D at ground or a positive potential. This action is necessary to prevent transfer of the bits in the reverse direction.

A feature of the ring counter used in this invention is a means to automatically inject a bit in one of the cores 21 if no bit is stored in any of the cores 21 or 22. This is accomplished by means of the resistor 34 and the starting network 35. If all of the cores 21 and 22 are in their ZERO states, then when a positive pulse is applied to the driving circuit A, this pulse will encounter little impedance due to the windings 23, since none of the windings 23 will have to cause any of the cores 21 to switch from their ONE state to their ZERO state. Almost the entire magnitude of the driving pulse will therefore appear across the resistor 34 and this pulse will be fed back through the starting network 35 to the input winding 26 of one of the cores 21. The starting network 35 delays the pulse fed back to the winding 26 by an amount such that when the fed back pulse is applied to the winding 26 there is no longer any pulse being applied to the driving winding 23 of this core 21. The pulse fed back through the network 35 will then cause this core 21 to switch to its ONE state. Thus one of the cores 21 will have a bit stored therein. When the next positive pulse is applied to the driving circuit A, this core 21 will be switched to its ZERO state and the next succeeding core 22 will be switched to its ONE state. Each succeeding pulse applied to the driving circuit A will not cause any bit to be stored in the core 21 because there will always be one core 21 in its ONE state when each succeeding pulse is applied to the driving circuit A. Thus each succeeding pulse applied to the driving circuit A must cause one of the cores 21 to switch from its ONE state to its ZERO state. The winding 23 on the core 21 which switches from its ONE state to its ZERO state will present a substantial impedance to the positive driving pulse applied to the driving circuit A. As a result little voltage will appear across resistor 34 and little voltage will be fed back through the feed back circuit 35 to the input winding 26 of the core 21. Therefore, if none of the cores 21 or 22 have a bit stored therein, then a bit will be generated in the core 21 positioned furtherest to the right in the figure. After this bit has been generated in this core, no additional bits will be generated and the single bit will be shifted from core to core in the shift register.

The shift register is also designed so that, if by chance, more than one bit should at any time be stored in the cores 21 and 22 of the shift register, all but one of the bits will be eliminated leaving only one bit to be transferred from core to core. If there appeared a bit in one of the cores 21 and a bit in one of the cores 22, the first driver pulse would switch one of the bits. After switching, both bits would be either in cores 21 or both in cores 22, depending upon which driver pulse, A or B, occurs first. If the A driver pulse occurred first, then both bits would be in cores 22, and conversely, if the B pulse occurred first then both bits would be in cores 21.

For purposes of illustration, assume that two bits have appeared in the shift register and both are in cores 21. As previously described, the windings 23 on cores 21 are polarized so that a positive pulse will reset the cores 21 to the ZERO state. Two of the cores 21, now being in the ONE state, will reflect an impedance in their windings 23. An A pulse received from the driver 40 will reset the two cores thereby generating a voltage across the windings 27. Since the instant of switching is not identical for all cores (this is due to the inherent difference in the windings and core material in the individual cores), one of the cores 21 will switch before the other. The voltage generated across winding 27 will be transmitted through a diode 31 to winding 28 of a core 22. This voltage causes the core 22 to switch to the ONE state.

When the core has switched, the impedance reflected across winding 28 decreases, thus applying the voltage developed by winding 27 to the bias network comprised of capacitor 37, diode 36 and resistors 18 and 38. This increases the bias voltage so that the windings 28 are biased at a level that will prevent the pulse from the second winding 27 from overcoming the bias. Thus the second core 22 is not switched and the second bit is eliminated.

The above description is of a preferred embodiment of the invention and many modifications may be made thereto without departing from the spirit and scope of the invention, which is limited only as defined in the appended claims.

What is claimed is:

1. A magnetic core shift register combination comprising a plurality of magnetic cores of the type having rectangular hysteresis loops, circuit means for advancing a stored bit sequentially and cyclically through said cores, said circuit means including a driver, driving windings on said cores connected in series, an impedance connected in series with said series connected driving windings, and means responsive to the voltage across said impedance exceeding a predetermined minimum for storing a bit in one of said cores.

2. The combination of a magnetic core shift register connected in a continuous ring, said cores of said shift register being of the type having rectangular hysteresis loops, means for applying driving pulses to said shift register having sufficient magnitude to continuously circulate a bit through said shift register, and bias means to prevent the continuous circulation of more than one bit through said shift register.

3. The combination of a shift register connected in a continuous ring, means to cause a stored bit to circulate in said shift register, and means for injecting a bit into said shift register in response to the condition of said shift register having no bit circulating therein, said combination including a means for eliminating all but one of the circulating bits in said shift register when more than one bit is circulating in said shift register.

4. The combination of a shift register connected in a continuous ring and a means for causing a stored bit to circulate in said shift register, said combination including a means for eliminating all but one of the circulating bits in said shift register when more than one bit is circulating in said shift register.

References Cited by the Examiner

UNITED STATES PATENTS

| | | | |
|---|---|---|---|
| 2,708,722 | 5/55 | Wang | 340—184 |
| 2,751,546 | 6/56 | Dimmer | 340—174 |
| 2,832,951 | 4/58 | Browne | 340—174 |
| 2,850,722 | 9/58 | Loev | 340—174 |
| 2,935,735 | 5/60 | Kodis | 340—174 |

IRVING L. SRAGOW, *Primary Examiner.*

EVERETTE R. REYNOLDS, JOHN F. BURNS, *Examiners.*